Patented Aug. 24, 1954

2,687,384

UNITED STATES PATENT OFFICE 2,687,384

WATER PAINT CONTAINING ENZYME-DIGESTED PROTEIN

Samuel M. Weisberg, East Islip, N. Y., assignor to National Dairy Research Laboratories, Inc., Oakdale, Islip, N. Y., a corporation of Delaware No Drawing. Application April 16, 1952,
Serial No. 282,691

12 Claims. (Cl. 260—7.5)

This invention relates to a water-thinned paint containing an enzyme-digested protein and, more particularly, to a water-thinned latex paint in which viscosity, levelling, mechanical stability and hard settling of the pigments are improved by incorporation of an enzyme-digested protein.

Water-thinned latex paints have found wide acceptance, and there is every indication that they will become important to the paint industry. They are simple to formulate and easy to apply, and their films are not attacked by alkali in masonry, are easy to clean, and have good scuff resistance.

The term "latex paint" has been applied to these paints because the principal vehicle in the paint is a latex emulsion of the same type of styrene or styrene-butadiene copolymers employed in the preparation of synthetic rubber by coagulation of the emulsion. These paints contain, in addition to the vehicle, pigments, pigment dispersants and the thickener and stabilizer, which is usually a protein dispersion. Auxiliary agents, such as antifoamers, preservatives, and reodorants are present in most instances. In addition, there may be an alkali in conjunction with the thickener and stabilizer.

The properties of a latex paint are closely related to the properties of the dispersed latex polymer. Although the latex is relatively solid and nontacky, it happens to exist in the paint dispersion in the form of discrete particles whose properties create special problems. These particles possess relatively poor adhesion to a foreign surface, but are strongly cohesive and are difficult to separate once they have been brought into contact with each other. In consequence, latex paints have relatively poor "freeze-thaw stability" because as ice crystals form in freezing, the latex particles are expelled from the emulsion and are pushed together into strongly cohesive clusters, which are difficult or impossible to break up and redisperse after thawing. Moreover, and again because of the nonadhesive cohesive nature of the particles, latex paints have relatively poor levelling properties; this is remedied by the addition of thickeners, including starch, casein and soya proteins, which act as levelling improvers.

The dispersed latex polymer particles also are less efficient in coating or surrounding a pigment particle than are the liquid globules of an oil or resin emulsion, which are capable of forming monomolecular layers on the pigment. For this reason, the critical P. V. C.[1] for latex paints, i. e., the point above which film porosity begins to appear, is in the neighborhood of 35% P. V. C. as compared to approximately 55% P. V. C. for an emulsion paint. This means that the hiding power for a latex paint must be obtained below 35% P. V. C. to avoid stain penetration. For this reason, too, successful formulation of latex paints may eventually require higher pigment loading to obtain satisfactory one-coat coverage. Unfortunately, an increase in pigment concentration would aggravate another problem arising from the presence of a thickener in the paint.

In latex water paints, a water mix of inorganic materials such as titanium dioxide and other oxides is widely employed as the pigment paste. However, titanium dioxide pigments are expensive, and from time to time are in short supply. In order to keep the cost at a minimum, it would be desirable to employ an inexpensive extender in conjunction with the titanium dioxide, particularly if, as suggested above, the amount of pigment is to be increased. Titanium dioxide is extended by physical combination with materials such as calcium sulfate, which products are useful as pigments and can be substituted for titanium dioxide. However, these extenders cannot be safely employed in latex paints when a protein is used as the stabilizer and levelling agent, because bivalent cations such as calcium react with protein to form a precipitate. In some instances a gelled mass may even result. Whether the precipitate or a gel is formed, it is obvious that the product is no longer useful as a paint since it cannot be brushed on a surface to give a smooth coating.

In accordance with the instant invention, a water-thinned paint is provided in which an enzyme-digested protein dispersion is employed to increase viscosity, to improve levelling and brushability, as well as mechanical stability, and

---

[1] Pigment Volume Concentration.

to inhibit hard settling of the pigments. The enzyme-digested protein of the invention does not form precipitates or gels in the presence of bivalent cations normally employed in inexpensive pigments or pigment extenders, and thus in the water-thinned paint of the invention such extenders can be employed without disadvantage. Furthermore, latex paints containing the enzyme-digested protein of the invention can contain appreciably increased pigment contents, of which a large proportion can be pigment extender.

I

The enzyme-digested protein of the invention is thought to be a novel material whose preparation has not been found in the literature. The properties of the material are very considerably dependent upon the process by which it is prepared and especially upon the digestion time. It will be understood that the terms "enzyme-digested" and "enzymolyzed" as applied to protein in the specification and claims refers to a protein digested in accordance with the general process which follows, and no other.

Protein is dispersed in water in the customary manner with an alkaline substance, such as an inorganic base, for example, sodium or ammonium hydroxide, or a basic inorganic salt, such as borax, sodium carbonate, sodium phosphate or sodium fluoride, or an organic base, such as ethanolamine, or a mixture of any of these substances. The protein content of the dispersion should be within the range from 10 to 35% and the pH should be from about 6 to about 8.5.

An aqueous dispersion of a proteolytic enzyme is then added. Any proteolytic enzyme capable of acting over the pH range stated can be used, but for convenience of use technical trypsin is preferred, as it is readily available in a form which is of uniform standardized activity. Papain may be employed, but the digestion proceeds more slowly than in the case of trypsin and this enzyme prefers to operate in the acid range, which is not advisable when casein protein is being digested inasmuch as casein protein precipitates at a pH within the range from 4 to 4.8. Pancreatin and orthozyme are good substitutes for trypsin.

The initial protein dispersion can be prepared at temperatures up to approximately 145° F. or higher. The upper temperature limit is not critical. However, the enzyme dispersion should not be added to the protein dispersion at temperatures above about 115° F. because at the higher temperatures enzyme activity may be reduced or even destroyed. Approximately 0.6 gram of enzyme usually is employed for each 250 grams of protein. The amount of enzyme is not critical and is usually selected to give a reasonable degree of hydrolysis in an optimum time of reaction. For economic reasons, there is no necessity for employing any more enzyme than is required to give the optimum reaction. In fact, it is desirable to avoid use of excessive quantities, inasmuch as the advantage in speed of reaction obtained above a certain quantity of enzyme is no longer proportional to the amount of enzyme added, and at the larger quantities very large amounts of enzyme are necessary to give a slight decrease in the total reaction time.

When the ratio of enzyme to protein is 0.6 gram to 250 grams, the digestion time in the case of milk casein should not be less than 20 minutes, but the time may exceed 20 minutes if desired, inasmuch as the compatibility with bivalent metal ions even at reaction times as high as 75 minutes continues to be excellent. However, it usually is not desirable to digest the casein longer than 75 minutes as the bonding and emulsifying power of the casein for water paint ingredients may be unduly diminished. Optimum results in the case of casein are obtained at digestion times within the range from 20 to 30 minutes.

In the case of Alpha soya protein, the enzymatic digestion time should not be appreciably less than 60 minutes. At 120 to 150 minutes digestion time, a reversal point for the protein has been noted where sensitivity to bivalent ions again is found. Consequently, if the digestion time exceeds 90 minutes, it should not be halted until it has extended to 150 minutes or longer.

The digestion can be arrested at any time by inactivating the enzyme, i. e., by heating the dispersion at a temperature at which the enzyme is destroyed, but not at so high a temperature as to injure the protein. Inactivation by heating the mixture at 170° F. for 30 minutes is satisfactory.

The following examples show typical procedures for the enzymolysis of milk casein and Alpha soya protein. These procedures can be applied to full scale production by using larger amounts of ingredients, as well as to other proteins which show a tendency to gel or thicken in the presence of bivalent metal cations.

*Example A*

Approximately 250 g. of milk casein are dispersed in 750 ml. of water and the dispersion brought to 115° F. Then 44 g. of borax are added and the mixture brought to 145° F. to complete the dispersion of the protein. The dispersion is cooled to 115° F. and an aqueous dispersion containing 0.36 g. (300:1) trypsin in 13.6 ml. of water is added with thorough mixing. The mixture is digested at 115° F. for approximately 20 minutes and then brought to 170° F. and held at that temperature for ½ hour. The mixture then is cooled to room temperature.

*Example B*

800 g. of Alpha soya protein is dispersed in 200 ml. of water and the dispersion brought to 115° F. A solution of 141 g. of borax in 1 liter of water is added and the mixture brought to 145° F. It is then cooled to 115° F., whereupon an aqueous dispersion of 5.2 g. (300:1) trypsin in 100 ml. of water is added and mixed in thoroughly. The digestion is allowed to continue at 115° F. for approximately 60 minutes. The mixture then is brought to 170° F. and kept there for one-half hour to inactivate the enzyme, and finally cooled to room temperature.

Dispersions of the enzyme-digested casein and Alpha soya proteins prepared as set forth above show only a slight tendency to thicken or gel in the presence of calcium sulfate, in contrast to dispersions of undigested soya protein and casein, as the following table shows.

The results were obtained by taking two 50 g. samples of the final mixture of Examples A and B, respectively, adding 4 g. of calcium sulfate to one of each pair of samples, mixing until uniform, and then taking viscosities of all samples after permitting the mixes to stand for the time indicated in the table. A Brookfield viscometer was employed, using the No. 4 spindle at 10 R. P. M. The scale read from 0 to 100 and values greater than 100 were obtained by calibrating a small paddle spindle against spindle No. 4.

| Sample | Remarks | Relative Viscosity | | | |
|---|---|---|---|---|---|
| | | Casein Dispersion of Example A—Stand Time Before Taking Reading | | Alpha Soya Protein Dispersion of Example B—Stand Time Before Taking Reading | |
| | | 0 hrs. | 20 hrs. | 0 hrs. | 20 hrs. |
| 1. Undigested—CaSO₄ added (7.4%) | Gelled | 114 | 155 | 150 | 175 |
| 2. Undigested—Control, no CaSO₄ | do | 21 | 34 | 55 | 70 |
| 3. Difference (1—2) | | 93 | 121 | 95 | 105 |
| 4. Trypsin Digest—CaSO₄ added (7.4%) | Not Gelled | 3.1 | 5.0 | 7.5 | 15 |
| 5. Trypsin Digest—Control, no CaSO₄ | do | 2.0 | 4.0 | 1.9 | 2 |
| 6. Difference (4—5) | | 1.1 | 1.0 | 5.6 | 13 |
| Difference between undigested (plus CaSO₄) and digested (plus CaSO₄) | | 110.9 | 150 | 142.5 | 160 |

II

The enzyme-digested protein prepared as set forth above is employed with particular advantage in water-thinned paints of the following general formulation:

|  | Percent |
|---|---|
| Pigment or extended pigment | 20 to 60 |
| Vehicle | 20 to 60 |
| Stabilizer | 0.5 to 25 |
| Auxiliary agents | 1 to 15 |
| Water | 1 to 25 |

The invention is particularly applicable to paints in which the stabilized vehicle comprises a synthetic latex of a high styrene or styrene-butadiene copolymer in water. As examples of such latices there can be mentioned Dow Latex 762–K or blends of Dow Latex 512–K and 529–K, or of Dow Latex 512–O and 529–K.

Dow Latex 762–K particles are between 0.2 and 0.3 micron in diameter. This latex is exceptionally stable to mechanical action, but it can be coagulated by excessive amounts of acid or by prolonged heating at temperatures approaching the boiling point of water. The properties of this latex are listed below:

| Percent solids | 48±1.5 |
|---|---|
| Specific gravity | 1.010–1.016 |
| Wt., solids per gallon (lbs.) | 4.07±0.14 |
| Antioxidant | No |
| pH of latex | 10±1 |
| Viscosity: | |
|    Brookfield (cps.) | 10–12 |
|    Ford Cup #4 (sec.) | 12–13 |
| Particle size (microns) | 0.2–0.3 |
| Surface tension (dynes/cm. at 25° C.) | 31–33 |
| Devolatilized | Yes |
| Film tensile strength (lbs./in.²) | 1300–2300 |
| Film elongation (%) | 400 to 600 |

Other butadiene-styrene copolymer latices which can be used include the GR–S latices, especially Types III and IV, Chemigum latex type 101, and Nubun. Latices of other synthetic rubbers which can be used include butadiene-acrylonitrile copolymers, Butaprene N rubbers, such as NXM, NL, NF and NI, and neoprene.

Latices of synthetic resins are also useful, such as latices of polyvinyl chloride, copolymers of vinyl chloride and vinyl acetate, copolymers of vinyl chloride and vinylidene chloride, polyvinyl acetate, partially hydrolyzed polyvinyl acetate, and polyvinyl acetals.

It is also possible to employ an additional vehicle, such as a film-forming alkyd resin, if desired. A blend of vehicles may increase the P. V. C. without affecting stain removal, improve adhesion over smooth surfaces and freeze-thaw stability and produce a better film "build." Aroplaz 1273 is an example of a suitable alkyd resin. Others are readily available and known to those skilled in this art.

The other component of the stabilized vehicle, the stabilizer, is an enzyme-digested protein of the invention.

The proportions of these components in the stabilized vehicle can be within the following ranges:

|  | Percent |
|---|---|
| Vehicle | 40 to 60 |
| Stabilizer | 60 to 40 |

The pigment employed should be compatible with the vehicle. Because of the excellent compatibility of the enzyme-digested protein, salts of calcium, magnesium and aluminum can be used without appreciable increase in viscosity. White pigments and extended pigments which can be used satisfactorily with the latex include mica, barium sulfate, titanium dioxide, clay, calcium carbonate, silica, lithopone and talc. Colored pigments and dyes include umber, phthalocyanine blue and green, toluidine toner, cadmium yellows, sienna, ultramarine blue, benzidine yellow, carbon black, iron oxide, hansa yellow, chromium oxides and hydroxides. This list is by no means complete, and any of the pigments and colored pigments offered for use in latex paints, and known to those skilled in the art, can be employed.

A pigment dispersant can be employed to enhance the stability of the paint and improve hiding power. Soya lecithin and gum arabic are satisfactory for this purpose.

Antifoamers can be incorporated when the paints are intended for brush or roller application. Useful antifoamers are Defoamer ED, Bubble Breaker 187, Foamrex S.3, and a mixture of pine oil and tributyl phosphate. Most antifoamers are either wax mixtures, such as a mixture of paraffin wax and glycerol monostearate, or silicone resins.

The enzymolyzed protein dispersion should be preserved against putrefaction by incorporating a phenol stabilizer, such as trichlorophenol. Dowicide A and Dowicide G are commercial phenolic preservatives. Usually less than 1% of the preservative will be adequate.

An alkali usually will be added to maintain the pH at this value. Borax is preferred, but sodium hydroxide, soluble alkali phosphates, ammonia, triethanolamine and potassium hydroxide can be used if desired.

Any odor which may be imparted to the paint by the latex or other components can be masked by including a suitable reodorant.

The paint can be formulated in any of the ways known to those skilled in the art.

Usually the pigments are ground in a pebble mill in a mixture of water and pigment stabilizer. The mix then can be transferred to a paint mixer and the enzymolyzed protein solution is added. These ingredients should be thoroughly blended, after which the antifoamer and preservatives are included. The vehicle can then be poured slowly into the mix in a manner to avoid introducing foam, after which the paint is blended for approximately 30 minutes. Additional enzymolyzed protein can then be added as desired to thicken the paint to a standard viscosity.

Many of the common pigments are easier to disperse in an aqueous system than in an oil paint. As a result, grinding of the pigments may not be essential in the manufacture of a latex paint. However, grinding will improve the hiding power of a given weight of pigment and also contributes to the formation of a more stable paint.

It is usually not desirable to subject a latex vehicle to pigment dispersing equipment because the latex may coagulate under the stress of the grinding action.

The enzyme-digested protein obtained according to the procedure outlined in Examples A and B is in the form of an aqueous dispersion containing approximately 20 to 30% of the protein. This can be diluted or concentrated to any desired solids content. Usually, however, it is best blended cold without further treatment with the paint components as outlined above.

The following examples are given to illustrate the formulation of water-thinned paints employing the enzyme-digested protein of the invention:

Example 1

The following is an example of a top-coat latex paint in accordance with the invention:

Ingredients:
    Titanium dioxide (rutile) _____parts__ 22.50
    Lithopone _____do____ 6.44
    Mica (325 mesh, wet ground) __do____ 3.21
    Lecithin (water dispersible) ____do____ 0.17
    Water (soft) _____do____ 20.62
    Enzymolyzed casein (30% aqueous solution) _____parts__ 3.53
    Antifoamer [1]
    Dowicide A/G [2] (1:1) (15% aqueous solution) _____parts__ 3.32
    Dow Latex 762–K (48% solids) _do____ 40.21

Weight per gallon_____lbs____ 11.12
Pigment volume concentration___per cent__ 29.50
Per cent nonvolatile_____ 53.29
Binder pigment ratio_____ 3:5

[1] Antifoamers:
    Defoamer E D—3.22 lbs. per 100 gals. of paint.
    Balab Bubble Breaker #187—4.30 lbs. per 100 gals. of paint.
    Foamrex S—4.30 lbs. per 100 gals. of paint (a 40% aqueous wax emulsion).
    Pine oil-tributyl phosphate (ratio 1:3)—18.3 lbs. per 100 gals. of paint.

[2] Dowicide A—Sodium o-phenylphenate.
Dowicide G—Sodium pentachlorophenate with small amounts of other chlorophenates.

To prepare the paint, the pigment is mixed and ground in a mixture of the casein and enough of the water to form a soluble paste. The remaining ingredients are mixed in after the grind, dissolving the Dowicide in the remaining water.

This paint gives a very smooth film due to the levelling action of the enzymolyzed casein.

Example 2

The following is a typical formulation of a primer-sealer in accordance with the invention:

Ingredients:
    Titanium dioxide (rutile) _____parts__ 5.09
    Mica (325 mesh, wet ground) __do____ 17.93
    Lecithin (water dispersible) ____do____ 0.10
    Water (soft) _____do____ 22.70
    Enzymolyzed casein (30% aqueous solution) _____parts__ 3.10
    Antifoamer [1]
    Dowicide A/G [2] (1:1) (15% aqueous solution) _____parts__ 3.38
    Dow Latex 762–K (48% solids)

Weight per gallon_____lbs____ 9.99
Pigment volume concentration___per cent__ 25.2
Per cent nonvolatile_____ 47.4
Binder pigment ratio_____ 1:1

[1] Antifoamers:
    Defoamer E D—3.42 lbs. per 100 gals. of paint.
    Balab Bubble Breaker #187—4.56 lbs. per 100 gals. of paint.
    Foamrex S—4.56 lbs. per 100 gals. of paint.
    Pine oil-tributyl phosphate (ratio 1:3)—19.4 lbs. per 100 gals. of paint.
[2] Dowicide A—Sodium o-phenylphenate.
Dowicide G—Sodium pentachlorophenate with small amounts of other chlorophenates.

The paint is prepared by mixing and grinding the pigment in a mixture of the casein solution and the water to form a soluble paste. The remaining ingredients are mixed in after the grind, dissolving the Dowicide in the remaining water.

This paint is characterized by easy brushability and superior sealing. Old wallpaper and composition boards are readily sealed and, in addition, coarse fibers are bound to the surface. The finish is not readily attacked by alkaline surfaces, such as plaster, cement, Transite, cinderblock and brick.

Example 3

A texture paint can be formulated as follows:

Ingredients:
    Dow Latex 762–K (48% solids) _parts__ 34.97
    Dowicide G_____do____ 0.32
    Tetrasodium pyrophosphate (3% aqueous solution) _____parts__ 1.04
    Ti-Pure R–510_____do____ 6.09
    DuPont Green GP–511D_____do____ 0.17
    100–200 mesh sand_____do____ 38.29
    325 mesh mica_____do____ 15.63
    Enzymolyzed casein (30% aqueous solution) _____parts__ 0.7
    Water _____do____ 2.79
Per cent solids_____ 77.5
Pounds per gallon_____ 13.7

This paint is a soft paste having a good slip under the brush and can also be applied and textured with a paint roller. It gives a tough resilient film which can easily be cleaned with soap and water with no change in appearance.

Example 4

An example of a paint containing an alkyd resin is as follows:

Ingredients:

| | | |
|---|---|---|
| "Titanox" RCHT-X | parts | 435.0 |
| "Titanox" RA-50 | do | 42.0 |
| Mica 3X | do | 45.0 |
| Dowicide A | do | 4.0 |
| Long Oil, 100% N. V. Alkyd (Aroplaz 1273 [2]) | parts | [1] 98.3 |
| Dow Latex 762-K | do | [1] 100.5 |
| 10% sodium hydroxide solution | parts | [1] 1.8 |
| Emulsifying agent (Igepal CTA) | parts | [1] 9.8 |
| 30% enzymolyzed casein solution | parts | [1] 20.0 |
| Water | do | 138.0 |
| 24% lead naphthenate | do | 8.0 |
| 6% cobalt naphthenate | do | 3.2 |
| Defoaming agent (Bubble Breaker #257) | parts | 1.0 |
| Pigment | percent | 45 |
| Vehicle | do | 55 |
| P. V. C. | do | 45.0 |
| Vehicle nonvolatile | do | 36.2 |

[1] Solids basis.

[2] Aroplaz 1273—a phthalic alkyd resin.

The driers are added to the alkyd resin and thoroughly mixed. To this is added the sodium hydroxide and Igepal CTA and the mix is again thoroughly agitated in order to emulsify the vehicle. The pigments and sufficient casein solution are added to produce a paste of grinding consistency. The mix is then ground on a loose roller mill. Thereafter the remainder of the casein solution and water are added, and after thorough mixing the Dow Latex 762-K and defoaming agent are added. Dowicide A should be dispersed in part in the water before addition, or it may be incorporated with the casein solution.

An oleoresinous vehicle can be used to replace the alkyd resin.

The films obtained with the above paint have the same excellent stain removal characteristics of low P. V. C. latex paints. A high P. V. C. is possible without affecting stain removal. The adhesion over smooth surfaces is good and a better film "build" is obtained. The enzymolized casein imparts excellent levelling properties to the paint.

Example 5

A green latex paint has the following formulation:

Ingredients:

| | | |
|---|---|---|
| "Titanox" RCHT-X | parts | 200.0 |
| Chromium Oxide Green | do | 100.0 |
| Ultramarine Blue | do | 12.5 |
| Mica 3X | do | 50.0 |
| Lithopone (Lorite WG) | do | 50.0 |
| Dowicide A | do | 4.0 |
| Long Oil, 100% N. V. Alkyd (Aroplaz 1273)[2] | do | [1] 108.0 |
| Dow Latex 762-K | do | [1] 110.0 |
| 10% sodium hydroxide | do | [1] 1.3 |
| Emulsifying agent (Igepal CTA) | do | [1] 10.7 |
| 30% enzymolyzed casein dispersion | do | [1] 21.9 |
| Water | do | 136.5 |
| 24% lead naphthenate | do | 8.0 |
| 6% cobalt naphthenate | do | 3.2 |
| Defoaming agent (Bubble Breaker #257) | do | 1.0 |
| Pigment | percent | 37.6 |
| Vehicle | do | 62.4 |
| P. V. C. | do | 36.0 |
| Vehicle nonvolatile | do | 37.2 |

[1] Solids basis.
[2] Aroplaz 1273—a phthalic alkyd resin.

In preparing the paint, the driers are added to the alkyd resin and thoroughly mixed. To this the sodium hydroxide and Igepal CTA are added and the mix emulsified. The pigments and sufficient enzymolyzed casein solution to produce a paste of grinding consistency are added and the mix then is ground on a loose roller mill. After that the remaining casein solution and water are added, and after thorough mixing the Dow Latex 762-K and defoaming agent are added. The Dowicide A can be dispersed in the water or in the casein solution.

This paint has excellent levelling properties compared to a paint containing ordinary casein.

Example 6

The following is a further example of a latex top-coat:

Ingredients:

| | | |
|---|---|---|
| "Titanox" RCHT | parts | 600.0 |
| Dowicide A | do | 4.0 |
| Dow Latex 512-K | do | [1] 131.0 |
| 30% enzymolyzed casein solution | parts | [1] 38.7 |
| Emulsifying agent (Igepal CTA) | parts | [1] 5.3 |
| Foamrex S | do | 0.8 |
| Water | do | 97.1 |
| Pigment | per cent | 47.3 |
| Vehicle | do | 52.7 |
| P. V. C | do | 60.0 |
| Nonvolatile | do | 26.2 |

[1] Solids basis.

The pigment is mixed and ground in a mixture of the casein solution, the Igepal CTA and enough water to form a suitable paste. The remaining ingredients are mixed in after the grind. The Dowicide A is dissolved in the remaining water.

This paint has superior levelling properties due to the enzymolyzed casein.

Example 7

The following example is of a simple paint employing a calcium sulfate-extended titanium dioxide pigment:

TiO₂-CaSO₄ pigment, 30 parts  ⎫
Water, 12 parts  ⎬ Pigment paste.
40% solids synthetic latex emulsion, 25 parts.  Vehicle.
Enzyme-digested casein dispersion, 20% solids, 22 parts.  Stabilizer.

To this formulation can be added foam preventatives, plasticizers and antioxidants as desired. The paint shows no tendency to thicken or gel on long storage.

It will be evident to those skilled in the art that many modifications can be made. For example, it is not always necessary to employ only enzyme-digested protein. In some instances, a small proportion of undigested protein can be included without appreciably detracting from the properties of the paint. It may also be desirable to include other thickeners and stabilizers in addition to the enzyme-digested protein, such as hydroxyethyl cellulose, methyl cellulose and the sodium salt of carboxymethylcellulose, which are more effective thickeners than the enzymolyzed protein. However, they tend to affect levelling disadvantageously, and it is therefore desirable to use the minimum amount of such thickeners required to obtain the intended effect.

The process of enzyme digestion is applicable to other proteins in addition to casein and Alpha soya protein, and such enzyme-digested protein dispersions can be used in the water-thinned paints of the invention.

The components of the water-thinned paints can be varied widely. For example, latices of polyvinyl chloride, polyvinyl acetate and copolymers of vinyl chloride and vinyl acetate can be substituted for the styrene-butadiene copolymer latex in any of the above examples, if desired. Accordingly, the invention is not to be limited except as set forth in the appended claims.

All parts and percentages in the specification and claims are by weight.

I claim:

1. A water paint comprising a synthetic latex and an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having bivalent metal ion compatibility as measured by the calcium sulfate test, while retaining good bonding and emulsifying power.

2. A paint in accordance with claim 1 in which the protein is milk casein.

3. A paint in accordance with claim 1 in which the protein is soya protein.

4. A water paint comprising a synthetic latex, a pigment and an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having bivalent metal ion compatibility as measured by the calcium sulfate test, while retaining good bonding and emulsifying power.

5. A paint in accordance with claim 4 in which the pigment comprises a titanium dioxide extended with a divalent metal salt.

6. A paint in accordance with claim 5 in which the pigment is $TiO_2$-$CaSO_4$.

7. A paint in accordance with claim 4 in which the protein is milk casein.

8. A paint in accordance with claim 4 in which the protein is soya protein.

9. A water-thinned latex paint comprising from 20 to 60% of a pigment, from 20 to 60% of a synthetic latex and from 0.5 to 25% of an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having bivalent metal ion compatibility as measured by the calcium sulfate test, while retaining good bonding and emulsifying power.

10. A water-thinned latex paint comprising synthetic latex, an alkyd resin and an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having bivalent metal ion compatibility as measured by the calcium sulfate test, while retaining good bonding and emulsifying power.

11. A water paint comprising a synthetic resin and an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having bivalent metal ion compatibility as measured by the calcium sulfate test, while retaining good bonding and emulsifying power.

12. A water paint comprising a synthetic resin, a pigment and an enzyme-digested protein stabilizer selected from the group consisting of enzyme-digested milk casein and soya protein and prepared by dispersing an isolated protein selected from the group consisting of milk casein and soya protein in water to form a dispersion with the aid of an alkaline substance in an amount to bring the pH to within the range from about 6 to about 8.5, adding a proteolytic enzyme which is active at a pH within that range and is capable of digesting milk casein or soya protein to a stage having calcium ion compatibility, and allowing the enzyme to digest the protein until there is produced a digested protein having a bivalent metal ion compatibility as measured by the calcium sulfate test, while retaining good bonding and emulsifying power.

References Cited in the file of this patent

UNITED STATES PATENTS

| Number | Name | Date |
|---|---|---|
| 1,978,533 | Holt | Oct. 30, 1934 |
| 2,246,983 | Oberg | June 24, 1941 |
| 2,320,165 | Atwood | May 25, 1943 |
| 2,436,239 | Weisberg et al. | Feb. 17, 1948 |
| 2,498,792 | Cotlet et al. | Feb. 28, 1950 |
| 2,511,722 | Lepetit | June 13, 1950 |

OTHER REFERENCES

Rinse, Paint Technology, February 1952, pp. 55 to 59 and 65.